United States Patent [19]

Walton

[11] Patent Number: 4,867,278

[45] Date of Patent: Sep. 19, 1989

[54] WHEEL CHOCKING DEVICE

[76] Inventor: James F. Walton, 3000 Valley Brook Rd., Tallahassee, Fla. 32308

[21] Appl. No.: 208,298

[22] Filed: Jun. 17, 1988

[51] Int. Cl.$^4$ ............................................. B60T 3/00
[52] U.S. Cl. ..................................... 188/32; D12/217
[58] Field of Search ........................... 188/32, 4, 5–8, 188/62; D12/217; 410/30, 4, 9, 19, 20, 49; 296/1 A, 37.1, 37.13, 37.5, 37.6; 414/463

[56] References Cited

U.S. PATENT DOCUMENTS

| | | | |
|---|---|---|---|
| 1,480,725 | 1/1924 | Israel | 188/32 |
| 1,621,504 | 3/1927 | Goodspeed | 188/32 |
| 1,712,644 | 5/1929 | Blakely | 188/32 |
| 1,712,645 | 5/1929 | Blakely | 188/32 |
| 1,761,068 | 6/1930 | Blakely | 188/32 |
| 2,517,673 | 8/1950 | Johnson | 188/32 |
| 3,318,419 | 5/1967 | Chastain | 188/32 |
| 3,387,686 | 6/1968 | Little | 188/32 |
| 3,700,077 | 10/1972 | Harder | 188/32 |
| 3,811,536 | 5/1974 | Haynes | 188/32 |
| 3,858,690 | 1/1975 | Facemire | 188/32 |
| 3,973,651 | 8/1976 | Garrett et al. | 188/32 |
| 4,228,936 | 10/1980 | Rife | 414/463 X |
| 4,421,210 | 12/1983 | Sugino | 188/32 |
| 4,476,961 | 10/1984 | Luigi | 188/32 |
| 4,711,325 | 12/1987 | Mountz | 188/32 |

FOREIGN PATENT DOCUMENTS

| | | | |
|---|---|---|---|
| 457706 | 3/1928 | Fed. Rep. of Germany | 188/32 |
| 300232 | 9/1954 | Fed. Rep. of Germany | 188/32 |
| 2218352 | 10/1973 | Fed. Rep. of Germany | 188/32 |
| 2240128 | 3/1975 | France | 188/32 |

Primary Examiner—Douglas C. Butler
Attorney, Agent, or Firm—Edward M. Livingston

[57] ABSTRACT

A wheel chocking device consisting of two components, one plate member having a flange at the end and a second plate having overlapping flange engaging sides, which can be assembled to form an inverted V-shaped wheel chocking device for use when changing a vehicle's tire, during vehicle maintenance or when parking a vehicle on a hill. This device can be quickly and easily disassembled for storage by sliding the first member into the same flange-engaging sides of the second member, and then stored in a proper location with the jack and spare tire where it can be located for future use, by attaching it to the jack post and spare tire carrier assembly through a slot provided in the plate member.

1 Claim, 2 Drawing Sheets

4,867,278

WHEEL CHOCKING DEVICE

BACKGROUND OF THE INVENTION

This invention relates generally to devices used to block or chock vehicle wheels to prevent movement of the vehicle during the changing of tires or when performing maintenance on the vehicle.

According to the Consumer Protection Agency, every year there are thousands of accidents involving jacks, jack stands and hoists. It is the Inventor's belief that a large portion of such accidents are related to a person's failure to properly brace the wheels of a vehicle while changing tires or working on the vehicle. This failure is probably most often due to the inability of the vehicle owner to find something to chock the wheels. Since vehicles are not sold with or provided with chocks or wheel blocking devices, a person must use rocks or pieces of wood to keep the vehicle from moving or rolling. The use of rocks or wood usually is unsafe and often proves inadequate. Thus, a need exists for such a device which can chock wheels and be easily stored with the jack and spare tire in the vehicle.

In general, the prior art does include some wheel chocks or blocks. For instance, chocks consisting of two wedge-like pieces of wood or metal attached together by a rope are commonly used in chocking the wheels of aircraft. Unfortunately, these wedge-like pieces are not easily stored and often cannot be found when needed. Prior patents also show some wheel blocks and chocking devices. For instance, U.S. Pat. No. 1,712,645 by Blakely shows a chocking device that has three pieces which interconnect to form a chocking device. U.S. Pat. No. 1,621,504 by Goodspeed shows a two-piece chocking device. Other patents such as U.S. Pat. No. 1,712,644, again by Blakely; U.S. Pat. No. 3,973,651 by Garrett, et al.; U.S. Pat. No. 4,711,325 by Mountz; and U.S. Pat. No. 3,700,077 by Harder all show different types of wheel chocking assemblies. Although many of these patented devices are collapsible for storage, none has the same design or the same means for assembly and disassembly, or can be and stored in a manner as easily as the instant invention.

SUMMARY OF THE INVENTION

The primary object of the instant invention is to provide a chocking device that will decrease accidents which occur during vehicle tire changing or vehicle maintenance.

A second object of the instant invention is to provide such a chocking device which can be easily and quickly assembled and disassembled.

Another object of the instant invention is to provide such a chocking device which can be easily stored where it belongs, that is, with the jack or spare tire.

An additional object is to provide such a chocking device which is strong and durable.

An even further object of the instant invention is to provide such a device which is compact and lightweight.

The instant invention accomplishes the above and other objects by providing a chocking device comprised of two pieces which interconnect to form an inverted "V" having two 45-degree angles, against which a vehicle tire can rest. The device is easily assembled by inserting a flange at the top of one plate member into the two slots formed by overlapping sides of the second plate member. When finished, the device is easily disassembled by pulling the flange from the top of the second plate member and then sliding the opposite end of the first plate member into the same flange receiving sides of the second plate member which results in a package approximately the size of just one plate member. When the two plate members are together in this manner, the device is very compact and can be stored almost anywhere.

In the preferred embodiment a rectangularly-shaped hole or slot is provided in the middle of each plate member so when the plate members are interconnected for storage, the slots are aligned so that the device can be placed over the post which normally holds the jack and/or spare tire in place in the automobile trunk or elsewhere. Thus, when the instant chocking device is needed, it can be located easily and quickly removed and assembled before even elevating the vehicle with the jack. The device is particularly strong since the two pieces brace each other to provide strength and is preferrably made of metal or high strength plastic.

Other objects, advantages and features of the invention will become readily apparent from the following detailed description of the specific embodiment thereof when read in conjunction with the accompanying drawings.

BRIEF DESCRIPTION OF THE DRAWINGS

The drawings appended to this application are as follows.

DETAILED DESCRIPTION OF THE PREFERRED EMBODIMENT

Figure 1:
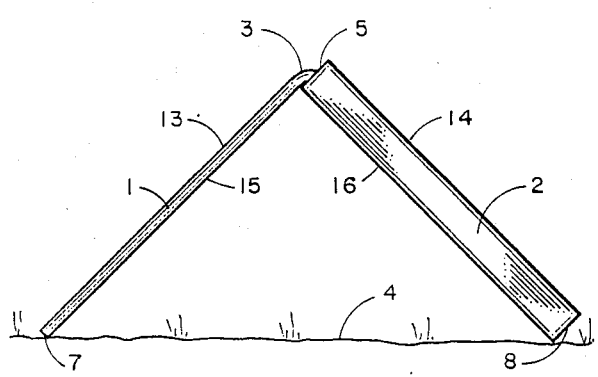
FIG. 1 is a side view of the invention in an assembled state.

Referring now to the drawings, the assembled invention as shown in FIG. 1 consists of two plate members 1 and 2, a flanged plate member 1, and a second plate member 2 having means for engaging a flange 6 at the top 3 of plate member 1. As further shown in FIG. 1, both plate members have a top surface 13 and 14 against which a tire can rest when chocking a vehicle. The bottoms 7 and 8 of the plate members 1 and 2, respectively, contact the ground or surface 4 to provide sufficient friction to keep the chocking device in place during use.

Figure 2:
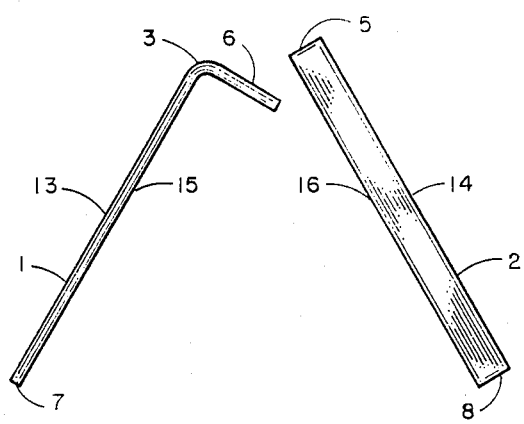
FIG. 2 is a side view of the invention in a disassembled state.
Figure 3:
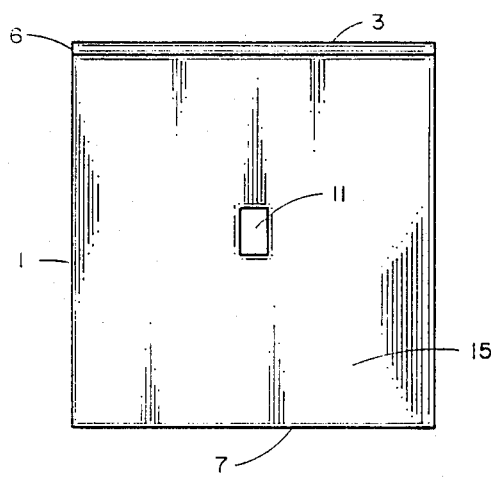
FIG. 3 is a top view of the inside surface of the components of the invention.
Figure 4:
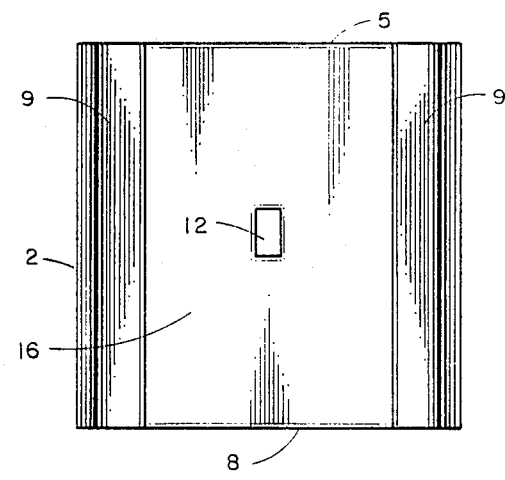
FIG. 4 is an end view from the connecting end of the components of the invention.
Figure 4:
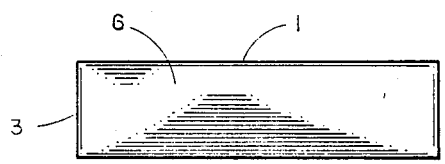
Figure 4:
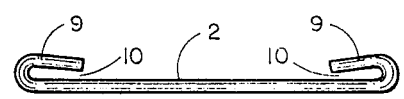
Figure 5:
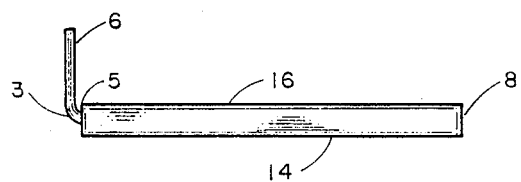
FIG. 5 is a side view of the invention in a collapsed storage state.

The two plate members 1 and 2 are shown in disassembled state in FIG. 2. In this view, the flange 6 may be seen at the top 3 of the first plate member 1. FIG. 3 shows the inner surfaces 15 and 16, respectively, of the plate members. The inside of the surface of the first plate member 1 shows the flange 6 at the top 3 and also a slot 11 through which a post used to secure a vehicle jack can be inserted. The inside 16 of the second plate member 2 also contains a matching slot 12 for the same purpose. In addition, the inside surface 16 of plate 2 shows two inwardly curved sides 9 which overlap the ends of the second plate 2. Due to the latter, between the sides 9 and the inner surface 16 of the second plate member 2, spaces 10 exist as shown more clearly in FIG. 4. These spaces 10 are provided for receiving the flange 6 when the device is in the assembled state previously shown in FIG. 1. When the device is disassembled, the device can be readied for storage merely by inserting the bottom end 7 of plate member 1 opposite the flange 6 all the way into the space 10 until only the flange 6 is showing. A side view of the device in a storage state is shown in FIG. 5.

Figure 6:
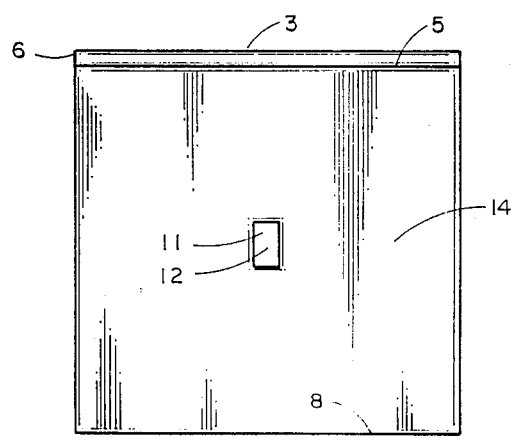
FIG. 6 is a top view of the invention in a collapsed storage state.

FIG. 6 shows a top view of the device in a storage state. In this view the slots of both plate members 11 and 12 are seen in alignment for insertion onto the same post used for storing a jack or spare tire. Only the top 3 of the first plate member and the flange 6 extends from the top 5 of the second plate member 2 when the device is in the storage state.

Figure 7:
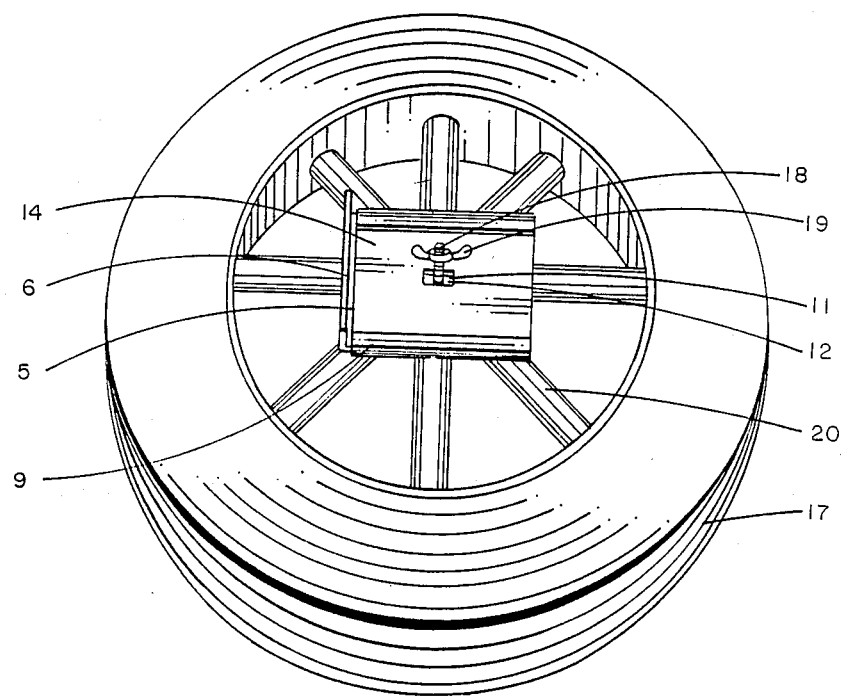
FIG. 7 is a perspective view showing the invention in a collapsed storage state as it would appear when stored with a spare tire.

The final drawing, FIG. 7, shows a perspective view of the invention as it would appear when stored with a spare tire 17, normally occur in the trunk of an automobile. The invention is shown mounted on the wheel 20 of the spare tire 17 with a post 18 inserted through the slots 11 and 12 of the plates. A wing nut 19 is tightened onto the post 18 to hold the invention in a secure position during storage.

Although the instant chocking device may be made of any high strength material, the Inventor contemplates the device would preferably be made of a metal or high strength plastic.

As described in detail above, it should be apparent that there has been provided a new, useful and nonobvious device for chocking the wheels of a vehicle during tire changing or vehicle maintenance which has many advantages over chocking devices in the prior art. The design of the device allows it to be easily assembled for use, and thereafter disassembled and stored in one piece where it belongs, that is, with the jack and spare tire, for future use. These latter features increase the chance that this strong, compact and lightweight chocking device will be used more by vehicle owners when necessary, thereby decreasing the number of accidents which occur every year during tire changing and vehicle maintenance.

While a specific embodiment of the invention has been described in detail hereinabove, it is to be understood that various modifications may be made from the specific details described hereinabove without departing from the spirit and scope of the invention as set forth in the appended claims.

Having described in detail my invention, I claim the following:

1. A wheel chocking device comprising:
    a first plate member of one-piece construction having a planar surface and an outwardly directed perpendicular flange at one end of said planar surface; and
    a second plate member of one-piece construction and of approximately the same size as said first plate member having means for receiving the flange of the first plate member, said means comprising two overlapping sides curved over and extending inward and parallel to the surface of said plate member with a space between the sides and said surface for receiving the flange of the first plate member comprising means for attaching the plate members to a post for storage with a spare tire, the attaching means comprising slots in the same location in each of said plate members through which the post may be inserted and said plate members secured on said post.

* * * * *